(12) United States Patent
Jang et al.

(10) Patent No.: US 10,651,455 B2
(45) Date of Patent: May 12, 2020

(54) RECHARGEABLE BATTERY

(71) Applicant: SAMSUNG SDI CO., LTD., Yongin-si, Gyeonggi-do (KR)

(72) Inventors: Myung-Jae Jang, Yongin-si (KR); Chi-Young Lee, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 527 days.

(21) Appl. No.: 14/921,789

(22) Filed: Oct. 23, 2015

(65) Prior Publication Data
US 2016/0315306 A1 Oct. 27, 2016

(30) Foreign Application Priority Data
Apr. 21, 2015 (KR) .................. 10-2015-0055924

(51) Int. Cl.
*H01M 2/30* (2006.01)
*H01M 2/06* (2006.01)
*H01M 2/04* (2006.01)
*H01M 2/02* (2006.01)

(52) U.S. Cl.
CPC ........... *H01M 2/30* (2013.01); *H01M 2/0426* (2013.01); *H01M 2/06* (2013.01); *H01M 2/0217* (2013.01); *H01M 2/0473* (2013.01)

(58) Field of Classification Search
CPC .......... H01M 2/30; H01M 2/06; H01M 2/029; H01M 2/0426; H01M 2/0482
See application file for complete search history.

(56) References Cited

U.S. PATENT DOCUMENTS

| | | | |
|---|---|---|---|
| 2010/0233528 A1* | 9/2010 | Kim | H01M 2/043 429/178 |
| 2013/0004832 A1 | 1/2013 | Kim et al. | |
| 2013/0122356 A1 | 5/2013 | Kim et al. | |

(Continued)

FOREIGN PATENT DOCUMENTS

| EP | 2 624 329 A1 | 8/2013 |
|---|---|---|
| WO | WO 2014/002523 A1 | 1/2014 |

OTHER PUBLICATIONS

EPO Search Report dated Aug. 18, 2016 for corresponding European Patent Application No. 15198648.6, (10 pages).

*Primary Examiner* — Ula C Ruddock
*Assistant Examiner* — Frank A Chernow
(74) *Attorney, Agent, or Firm* — Lewis Roca Rothgerber Christie LLP

(57) ABSTRACT

A rechargeable battery includes: a case accommodating an electrode assembly; a cap plate closing and sealing an opening of the case; an electrode terminal including a rivet terminal being coupled to the electrode assembly and extending through a terminal opening in the cap plate, and a plate terminal being at an outer surface of the cap plate and coupled to the rivet terminal; and an insulating member electrically insulating the electrode terminal from the cap plate, the insulating member including a first insulator and a second insulator. The first insulator being between the cap plate and the plate terminal at an outer periphery of the rivet terminal, and the second insulator being coupled to the first insulator at an outer periphery of the first insulator and between the cap plate and the plate terminal.

11 Claims, 7 Drawing Sheets

(56) References Cited

U.S. PATENT DOCUMENTS

| | | | |
|---|---|---|---|
| 2013/0196186 A1* | 8/2013 | Yokoyama | H01M 2/22 429/53 |
| 2015/0372261 A1 | 12/2015 | Suzuki et al. | |

* cited by examiner

RECHARGEABLE BATTERY

CROSS-REFERENCE TO RELATED APPLICATION

This application claims priority to and the benefit of Korean Patent Application No. 10-2015-0055924, filed in the Korean Intellectual Property Office on Apr. 21, 2015, the entire content of which is incorporated herein by reference.

BACKGROUND

1. Field

Aspects of embodiments of the present invention relate to a rechargeable battery having a cap plate which is insulated from electrode terminals.

2. Description of the Related Art

A rechargeable battery differs from a primary battery in that it is designed to be repeatedly charged and discharged, while the latter is not designed to be recharged. Low-capacity rechargeable batteries are used in small, portable electronic devices, such as mobile phones, notebook computers, and camcorders, while high-capacity rechargeable batteries are widely used as a power source for driving a motor of a hybrid vehicle, for example.

A rechargeable battery generally includes: an electrode assembly having a positive electrode and a negative electrode at opposite surfaces of a separator; a case for accommodating the electrode assembly; a cap plate for sealing an opening of the case; and an electrode terminal electrically coupled to the electrode assembly and penetrating the cap plate. Generally, the electrode terminal is electrically insulated from the cap plate by an insulating member interposed therebetween.

When a width of the rechargeable battery is small and the cap plate is welded to the opening of the case, the insulating member may melt due to welding heat, thereby causing visual appearance and processing defects.

The above information disclosed in this Background section is only to enhance the understanding of the background of the invention, and therefore, it may contain information that does not form prior art.

SUMMARY

Aspects of an embodiment of the present invention provide a rechargeable battery that is capable of preventing damage to an insulating member provided between a cap plate and an electrode terminal when the cap plate is welded to an opening of the case.

A rechargeable battery according to an exemplary embodiment of the present invention includes: a case accommodating an electrode assembly; a cap plate closing and sealing an opening of the case; an electrode terminal including a rivet terminal and a plate terminal, the rivet terminal being coupled to the electrode assembly and extending through a terminal opening in the cap plate, and the plate terminal being at an outer surface of the cap plate and coupled to the rivet terminal; and an insulating member electrically insulating the electrode terminal from the cap plate, the insulating member including: a first insulator and a second insulator, the first insulator being between the cap plate and the plate terminal at an outer periphery of the rivet terminal, and the second insulator being coupled to the first insulator at an outer periphery thereof and being provided between the cap plate and the plate terminal.

The first insulator may accommodate the rivet terminal via an opening corresponding to the terminal opening and includes a first hook at one side thereof, and the second insulator may include a second hook, the second hook may be coupled to the first hook.

The second insulator may surround the outer periphery of the first insulator, and the second insulator may include a third hook combined to a side of the first insulator opposite to a side thereof at which the first hook is arranged.

The second insulator may include: an insertion plate having the same thickness as the first insulator and arranged between the cap plate and the plate terminal; and a protrusion rim protruding along an outer edge of the insertion plate to surround the periphery of the plate terminal.

The protrusion rim may extend along each side of the second insulator except the side thereof at which the third hook is arranged to surround the periphery of the plate terminal.

The first insulator may include a first hook and may be coupled to the electrode terminal in a stacking direction of the cap plate, and the second insulator may be inserted to be between the cap plate and the terminal plate in a lateral direction perpendicular to the stacking direction and may be coupled to the first insulator by the first hook.

The second insulator may include a second hook and a third hook, the second hook being at an inner side of the second insulator. The first hook of the first insulator may be coupled to the second hook, and the third hook may be coupled to the first insulator at an opposite side of the first insulator with respect to the first hook.

The first insulator may have long sides corresponding to a length direction of the cap plate and short sides corresponding to a width direction of the cap plate, and the first insulator may include a first hook at one of the short sides thereof.

The second insulator may have long and short sides respectively corresponding to the long and short sides of the first insulator, the second insulator may include a second hook at one of the short sides thereof, and the second hook may be coupled to the first hook.

The second insulator may include: an insertion plate having the same thickness as the first insulator and arranged between the cap plate and the plate terminal; and a protrusion rim protruding along an outer edge of the insertion plate to surround a periphery of the plate terminal. The protrusion rim is at the long sides of the second insulator and a one of the short sides nearest to the second hook.

The first insulator may have a width that is less than a width of the cap plate, and the second insulator may have a width substantially the same as the width of the cap plate.

According to an exemplary embodiment of the present invention, by including separate first and second insulators, welding the cap plate to the case after assembling the first insulator with the cap plate, and then assembling the second insulator with the cap plate, melting and combustion of the insulating member can be prevented when the cap plate and the case are welded together.

Accordingly, insulation performance between the cap plate and the electrode terminal (e.g., the plate terminal) can be improved by the insulating member and mechanical strength of the plate terminal can be increased.

DETAILED DESCRIPTION

Figure 1:
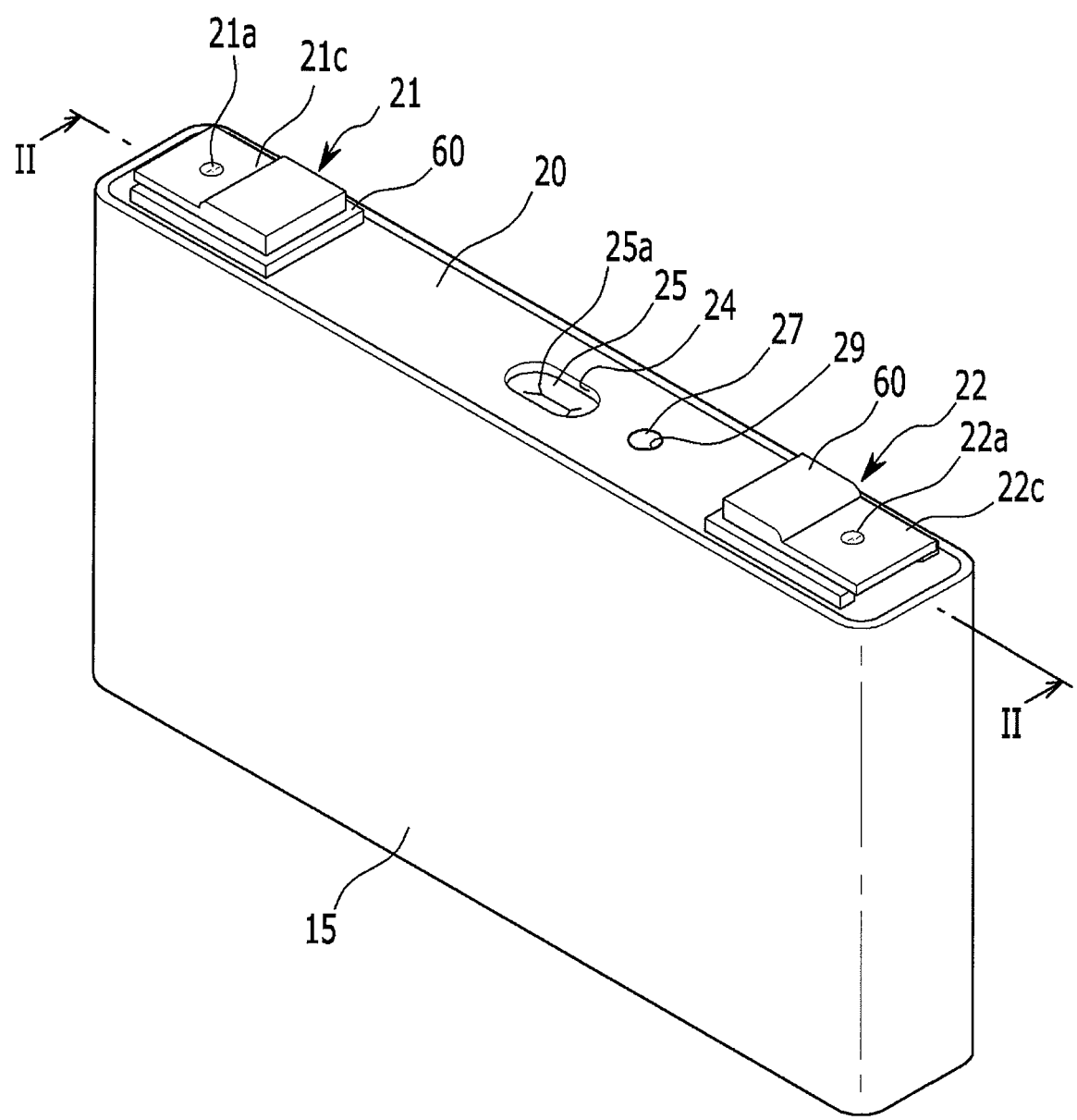
FIG. 1 is a perspective view of a rechargeable battery according to an exemplary embodiment of the present invention.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments or the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
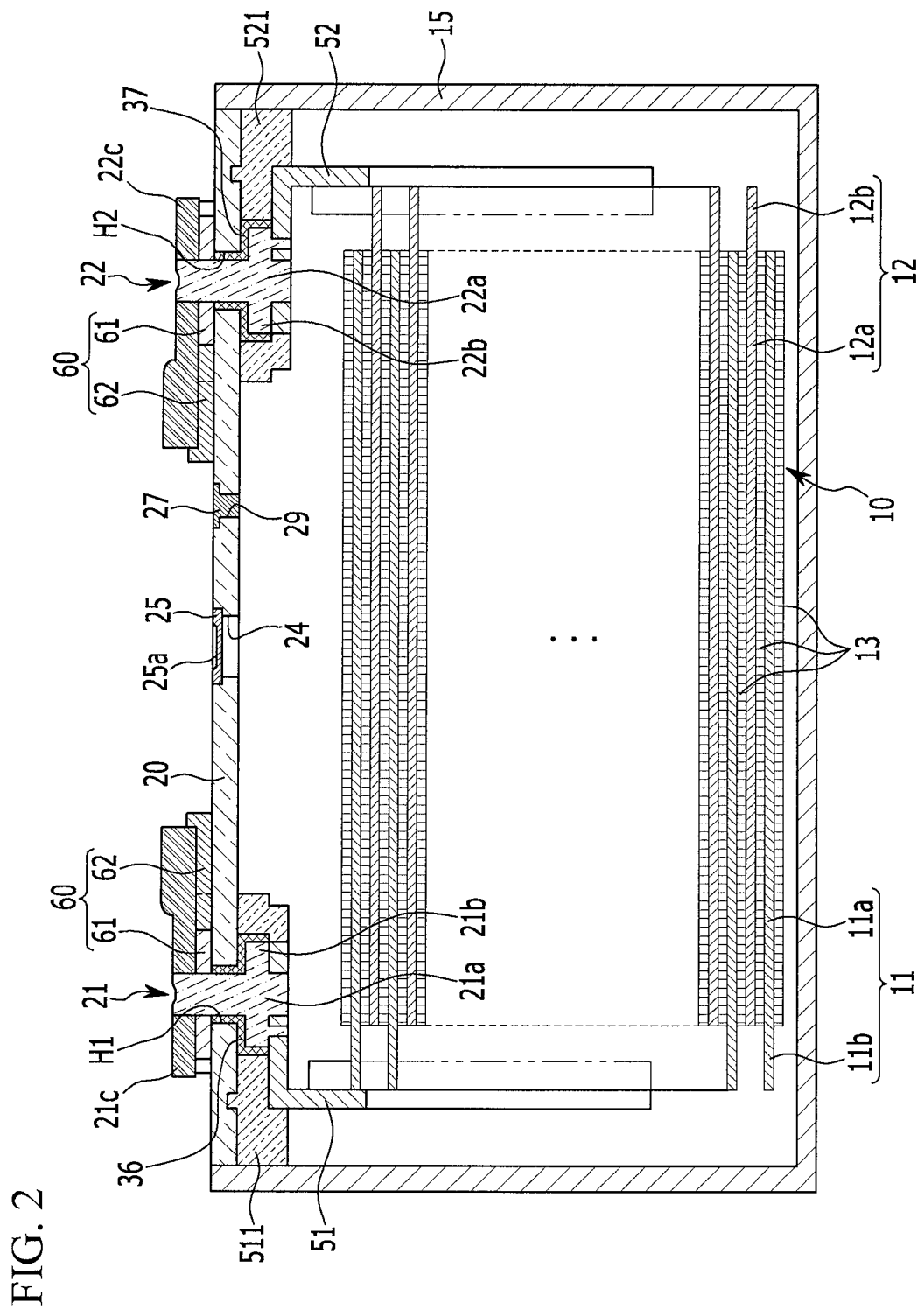
FIG. 2 is a cross-sectional view taken along the line II-II of FIG. 1.

FIG. 1 is a perspective view of a rechargeable battery according to an exemplary embodiment of the present invention, and FIG. 2 is a cross-sectional view taken along the line II-II of FIG. 1. Referring to FIGS. 1 and 2, the rechargeable battery according to an exemplary embodiment includes: an electrode assembly 10 through which a current is charged (e.g., stored) and discharged; a case 15 in which the electrode assembly 10 and an electrolyte solution is accommodated; a cap plate 20 for sealing an opening of the case 15; electrode terminals penetrating (e.g., extending through) the cap plate 20 (e.g., negative and positive electrode terminals 21 and 22, respectively); and insulating members 60 for electrically insulating the negative and positive electrode terminals 21 and 22 from the cap plate 20, respectively. However, in another embodiment, only one insulating member 60 may be included to insulate either the negative electrode terminal 21 or the positive electrode terminal 22 from the cap plate.

For example, the electrode assembly 10 is formed by disposing negative and positive electrodes 11 and 12 at opposite surfaces of a separator 13, which acts as an insulator, and spirally winding the negative electrode 11, the separator 13, and the positive electrode 12 to be in a jelly-roll state. The negative and positive electrodes 11 and 12 respectively include coated regions 11a and 12a at which an active material is coated on current collectors made of, for example, a metal plate and uncoated regions 11b and 12b which are exposed portions of the current collectors (e.g., portions of the current collectors at which an active material is not coated thereon).

The uncoated region 11b of the negative electrode 11 is formed at one end portion of the negative electrode 11 along the wound electrode assembly 10. The uncoated region 12b of the positive electrode 12 is formed at one end portion of the positive electrode 12 along the wound electrode assembly 10. That is, the uncoated regions 11b and 12b of the negative and positive electrodes 11 and 12 are respectively disposed at opposite ends of the electrode assembly 10.

For example, the case 15 is formed in a substantially cuboid shape to have a space for accommodating the electrode assembly 10 and the electrolyte solution therein, and the opening of the case 15 is formed at one side of the cuboid to connect inner and outer spaces of the case 15 (e.g., to allow the inner and outer spaces of the case 15 to communicate with each other). The opening allows the electrode assembly 10 to be inserted into the case 15.

The cap plate 20 is installed at (e.g., in) the opening of the case 15 to close and seal the case 15. For example, the case 15 and the cap plate 20 may be welded to each other when they are made of aluminum.

In addition, an electrolyte injection opening 29, a vent opening 24 (e.g., a vent hole), and terminal openings H1 and H2 (e.g., terminal holes H1 and H2) are provided in the cap plate 20. After combining the cap plate 20 to the case 15, the electrolyte injection opening 29 allows the electrolyte solution to be injected into the case 15. After the injection of the electrolyte solution, the electrolyte injection opening 29 is sealed by a sealing cap 27.

The vent opening 24 is closed and sealed by a vent plate 25 such that it can discharge internal pressure (e.g., discharge excess internal pressure) of the rechargeable battery. That is, when the internal pressure of the rechargeable battery reaches a certain level (e.g., a predetermined level), the vent plate 25 ruptures to open the vent opening 24. The vent plate 25 is provided with a notch 25a that induces the rupture.

The negative and positive electrode terminals 21 and 22 are provided in the terminal openings H1 and H2 of the cap plate 20, respectively, and are electrically coupled to the electrode assembly 10. For example, the negative electrode terminal 21 is electrically coupled to the negative electrode 11 of the electrode assembly 10, and the positive electrode terminal 22 is electrically coupled to the positive electrode 12 of the electrode assembly 10. Accordingly, the electrode assembly 10 may be drawn out of the case 15 via the negative electrode terminal 21 and the positive electrode terminal 22.

The negative and positive electrode terminals 21 and 22 respectively include rivet terminals 21a and 22a that are respectively provided in the terminal openings H1 and H2 of the cap plate 20 and plate terminals 21c and 22c that are respectively coupled to the rivet terminals 21a and 22a by riveting or welding and disposed outside of the cap plate 20 (e.g., are disposed on an outer surface of the cap plate 20). The negative and positive electrode terminals 21 and 22 further include integral flanges 21b and 22b that are formed at an inner side of the cap plate 20 (e.g., at an inner surface of the cap plate 20) and extend widely from the rivet terminals 21a and 22a.

One side of each of the plate terminals 21c and 22c that is connected to the rivet terminals 21a and 22a is provided with a thicker portion (e.g., a portion of each of the plate terminals 21c and 22c is thicker than an adjacent portion thereof), and thus, welding strength with a bus bar can be improved when a pack of the rechargeable batteries is formed (e.g., the strength of the weld between the rivet terminals and bus bars can be improved when a plurality of the rechargeable batteries are included in a pack).

Each of the insulating members 60 includes a first insulator 61 and a second insulator 62 that are separately formed and then combined with (e.g., coupled to) each other. In a first one of the insulating members 60, the first insulator 61 is disposed between the plate terminal 21c and the cap plate 20 around an outer circumference (e.g., an outer periphery) of the rivet terminal 21a. In a second one of the insulating members 60, the first insulator 61 is disposed between the plate terminal 22c and the cap plate 20 around an outer circumference of the rivet terminal 22a. Accordingly, the first insulators 61 may electrically insulate the cap plate 20 from the rivet terminals 21a and 22a and may electrically insulate the plate terminals 21c and 22c from the cap plate 20.

In the first one of the insulating members 60, the second insulator 62 is combined to an outer circumference of the first insulator 61 and is additionally provided between the cap plate 20 and the plate terminal 21c. In the second one of the insulating members 60, the second insulator 62 is combined to an outer circumference of the first insulator 61 and is additionally provided between the cap plate 20 and the plate terminal 22c. Accordingly, the second insulators 62 further insulate the cap plate 20 from the plate terminals 21c and 22c around the outer circumference of the first insulator 61. For example, the cap plate 20 and the plate terminals 21c and 22c are electrically insulated from each other by the first and second insulators 61 and 62.

The rechargeable battery further includes gaskets 36 and 37 that are interposed between the rivet terminals 21a and 22a and the terminal openings H1 and H2, respectively. The gaskets 36 and 37 are respectively provided between the rivet terminals 21a and 22a and inner surfaces of the terminal openings H1 and H2 of the cap plate 20 to seal the terminal openings H1 and H2 and electrically insulate the rivet terminals 21a and 22a from the cap plate 20.

In addition, the gaskets 36 and 37 further extend to be between the flanges 21b and 22b and an inner surface of the cap plate 20, respectively, to seal the terminal openings H1 and H2 and to electrically insulate the flanges 21b and 22b from an inner surface of the cap plate 20.

Negative and positive electrode lead tabs 51 and 52 respectively electrically couple the negative and positive electrode terminals 21 and 22 to the uncoated regions 11b and 12b of the negative and positive electrodes 11 and 12 of the electrode assembly 10. For example, by respectively combining (e.g., coupling or joining) the negative and positive electrode lead tabs 51 and 52 to lower ends of the rivet terminals 21a and 22a and caulking the lower ends thereof, the negative and positive electrode lead tabs 51 and 52 are supported by the flanges 21b and 22b and are connected to the lower ends of the rivet terminals 21a and 22a.

Internal insulating members 511 and 521 are respectively provided between the negative and positive electrode lead tabs 51 and 52 and the cap plate 20 and electrically insulate the negative and positive electrode lead tabs 51 and 52 from the cap plate 20. In addition, one side of each of the insulating members 511 and 521 is combined to the cap plate 20 while the other side encloses (e.g., surrounds) the negative and positive electrode lead tabs 51 and 52, the rivet terminals 21a and 22a, and the flanges 21b and 22b, thereby stabilizing a connecting structure therebetween.

Figure 3:
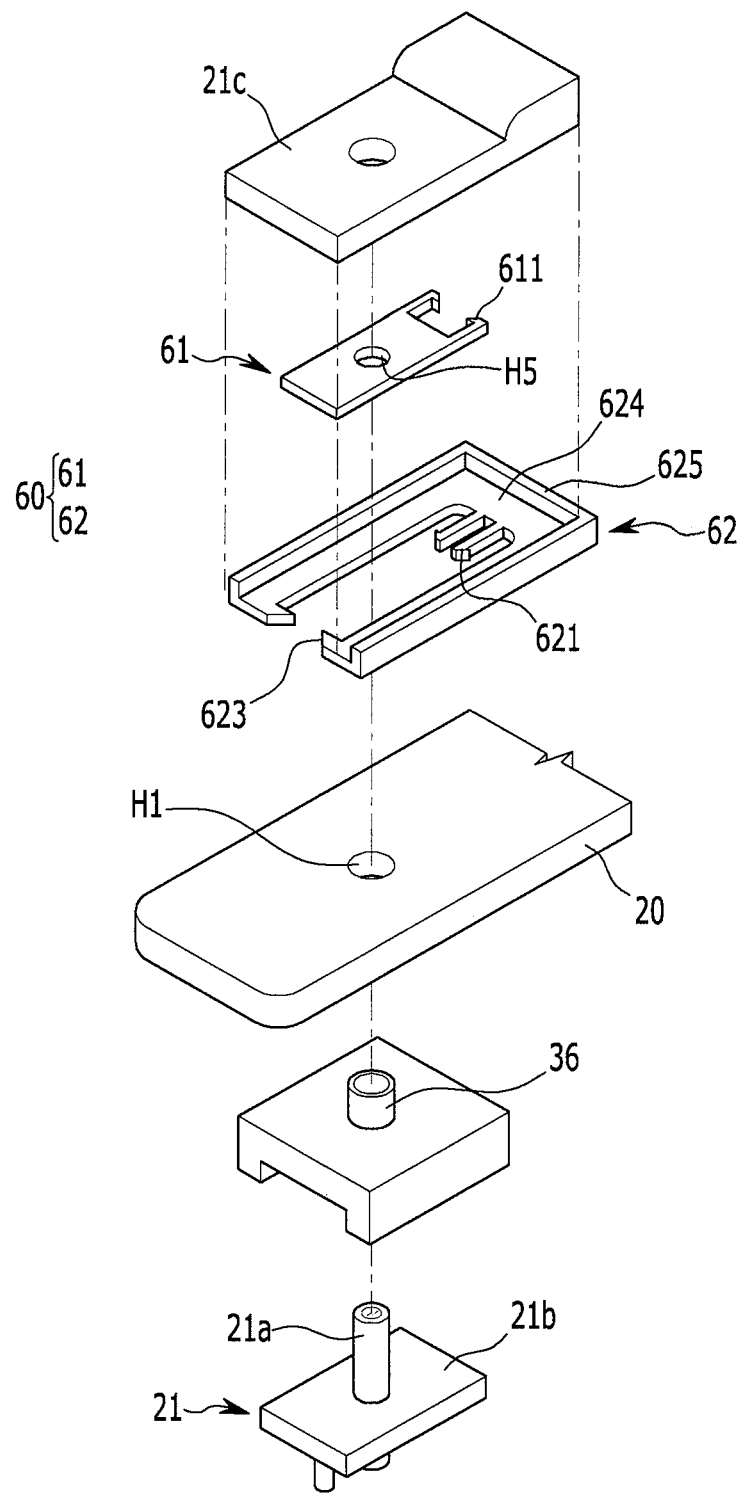
FIG. 3 is an exploded perspective view of an electrode terminal and a cap plate shown in FIG. 1.
Figure 4:
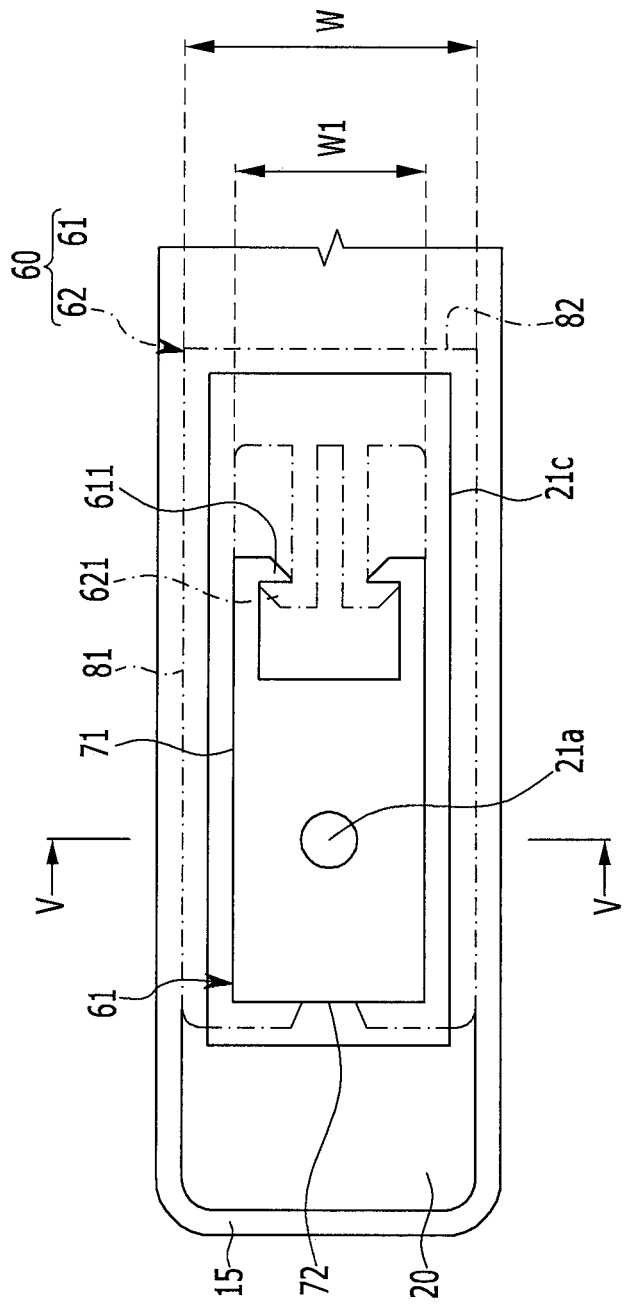
FIG. 4 is a top plan view of the electrode terminal assembled to the cap plate after interposing a first insulator shown in FIG. 3 therebetween.
Figure 5:
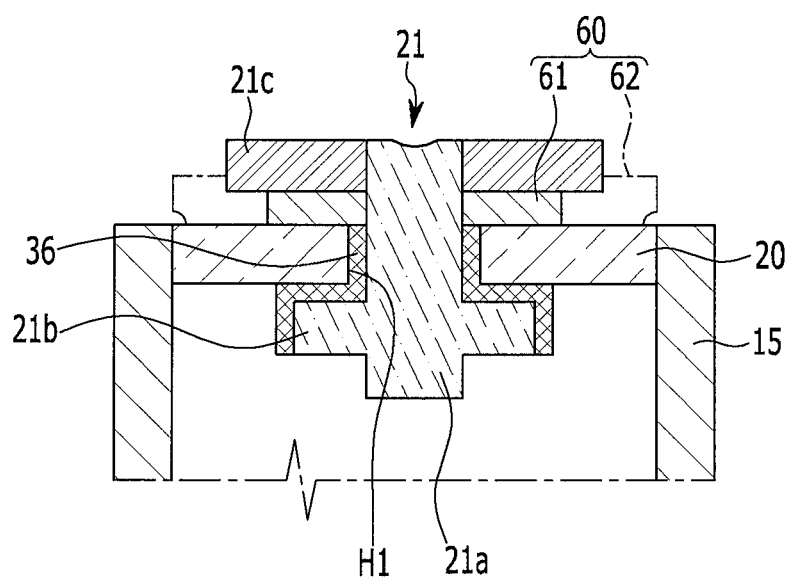
FIG. 5 is a cross-sectional view taken along the line V-V of FIG. 4.

FIG. 3 is an exploded perspective view of an electrode terminal and a cap plate shown in FIG. 1, FIG. 4 is a top plan view of the electrode terminal assembled to the cap plate after interposing a first insulator shown in FIG. 3 therebetween, and FIG. 5 is a cross-sectional view taken along the line V-V of FIG. 4.

The insulating member 60 provided in each of the negative and positive electrode terminals 21 and 22 is the same or substantially the same, so the first one of the insulating members 60 and the cap plate 20 near the negative electrode terminal 21 will be primarily described for ease of description. Referring to FIGS. 3 to 5, the first insulator 61 of the first one of the insulating members 60 allows the rivet terminal 21a to penetrate an opening H5 (e.g., a through-hole H5) corresponding to the terminal opening H1 and includes a first hook 611 at one side thereof.

The second insulator 62 of the first one of the insulating members 60 includes a second hook 621 that is disposed to face the first hook 611, and the second insulator 62 is combined to (e.g., coupled to) the first insulator 61 by the first hook 611 and the second hook 621. In addition, the second insulator 62 encloses the first insulator 61 from a lateral direction (e.g., the second insulator 62 surrounds or substantially surrounds a periphery of the first insulator 61), includes a third hook 623 at an opposite side thereof with respect to the second hook 621, and is combined to an opposite side of the first insulator 61 with respect to the first hook 611 thereof via the third hook 623.

In addition, the second insulator 62 includes an insertion plate 624 that is formed to have the same or substantially the same thickness as the first insulator 61 and a protrusion rim 625 that is formed to be thicker than the insertion plate 624. The insertion plate 624 is disposed between the cap plate 20 and the plate terminal 21c and insulates the cap plate 20 from the plate terminal 21c along with the first insulator 61.

The protrusion rim 625 protrudes along an outer edge of the insertion plate 624 and encloses a lateral surface (e.g., a periphery) of the plate terminal 21c. The protrusion rim 625 encloses the lateral surface of the plate terminal 21c except at the side at which the third hook 623 is arranged. For example, the second insulator 62 has an opening at the side thereof at which the third hook 623 is arranged, and the protrusion rim 625 is not present at the side of the insertion plate 624 at which the third hook 623 is arranged so the second insulator 62 can be inserted around the outer circumference of the first insulator 61.

For example, the first insulator 61 is stacked at (e.g., arranged at or on) an external surface of the cap plate 20 in a stacking direction and is combined to the rivet terminal 21a of the negative electrode terminal 21. In addition, the second insulator 62 is inserted from a lateral direction (e.g., a direction perpendicular to the stacking direction) to be between the cap plate 20 and the plate terminal 21c and is combined to the first hook 611 of the first insulator 61 while enclosing the first insulator 61.

In one embodiment, the first hook 611 of the first insulator 61 is combined to the second hook 621 that is provided at an inner side of the second insulator 62. In addition, the third hook 623 of the second insulator 62 is combined to an end portion of the first insulator 61 at the opposite side of the first insulator 61 with respect to the first hook 611. For example, the first and second insulators 61 and 62 are closely attached to each other along a width direction of the cap plate 20 and are hook-coupled at opposite sides thereof in a length direction of the cap plate 20, thereby maintaining a strong fastening force therebetween.

In one embodiment, the first insulator 61 is formed as a substantial quadrangular plate having long sides 71 corresponding to the length direction of the cap plate 20 and short sides 72 corresponding to the width direction of the cap plate 20, and the first hook 611 is on one of the short sides 72.

The second insulator 62 is formed as a substantial quadrangular plate having long sides 81 and short sides 82 that respectively correspond to the long and short sides 71 and 72 of the first insulator 61, includes the second hook 621 at the short side 82 that faces the first hook 611, and is combined to the first hook 611 via the second hook 621.

The protrusion rim 625 protrudes toward the lateral surface of the plate terminal 21c from the opposite long sides 81 and the short side 82 near the first hook 611, thereby enclosing or substantially enclosing the lateral surface of the plate terminal 21c.

The first insulator 61 has a smaller width W1 than a width W of the cap plate 20. Accordingly, when the cap plate 20 and the case 15 are welded together, the first insulator 61 is not significantly affected by welding heat and/or a laser. For example, even though a welding process occurs, the first insulator 61 does not melt or burn, such that the cap plate 20 and the plate terminal 21c are stably insulated from each other.

Referring to FIG. 5, by combining the first insulator 61 and the plate terminal 21c and then caulking an upper end of the rivet terminal 21a, the first insulator 61 and the plate terminal 21c are combined to the upper end of the rivet terminal 21a.

Figure 6:
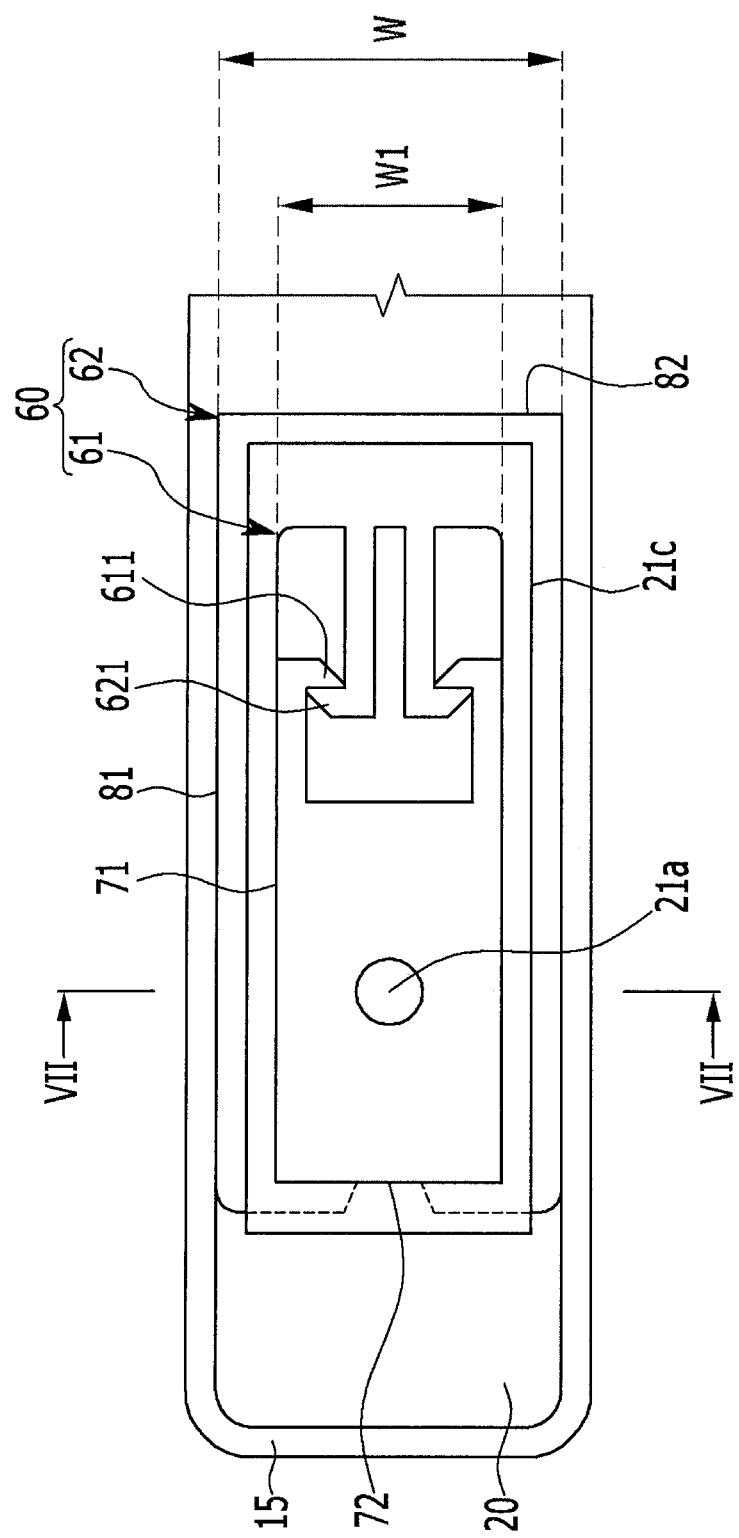
FIG. 6 is a top plan view of a second insulator assembled to an outer circumference of the first insulator shown in FIG. 4.
Figure 7:
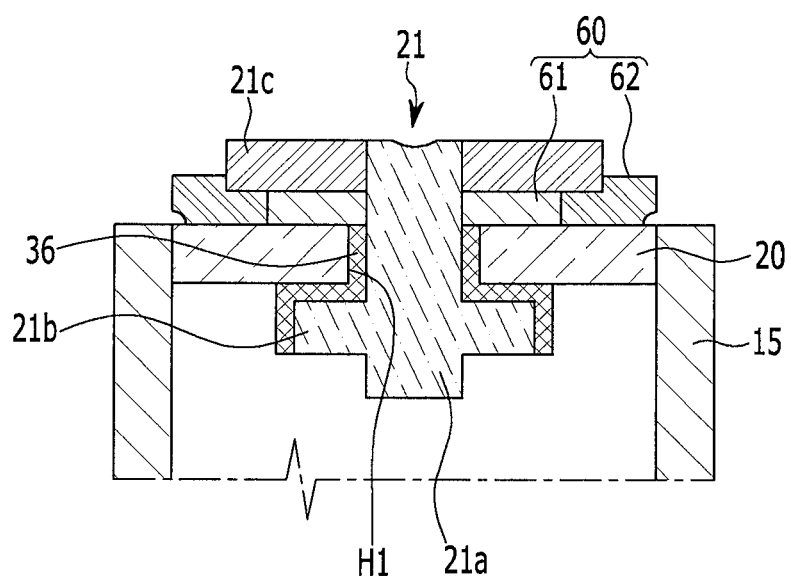
FIG. 7 is a cross-sectional view taken along the line VII-VII of FIG. 6.

FIG. 6 is a top plan view of a second insulator assembled to an external circumference of the first insulator shown in FIG. 4, and FIG. 7 is a cross-sectional view taken along the line VII-VII of FIG. 6. Referring to FIGS. 6 and 7, the second insulator 62 has the width W corresponding to (e.g., the same or substantially the same as) the width W of the cap plate 20.

By installing the second insulator 62 after the welding, the second insulator 62 can avoid the welding heat. Accordingly, the second insulator 62 may provide improved insulating performance between the plate terminal 21c and the cap plate 20 as well as providing increased strength of the plate terminal 21c.

Referring to FIGS. 3, 6, and 7, the second insulator 62 of the insulating member 60 is inserted between the plate terminal 21c and the cap plate 20 from the lateral direction of the first insulator 61 and electrically insulates the plate terminal 21c from the cap plate 20 at the outer circumference of the first insulator 61.

While the present invention has been described in connection with what is presently considered to be practical exemplary embodiments, it is to be understood that the invention is not limited to the disclosed embodiments, but is intended to cover various modifications and equivalent arrangements included within the spirit and scope of the appended claims and their equivalents.

Description of Some Reference Symbols

| | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21, 22: electrode terminal (negative/positive electrode terminal) | |
| 21a, 22a: rivet terminal | |
| 21b, 22b: flange | 21c, 22c: plate terminal |
| 24: vent hole | 25: vent plate |
| 25a: notch | 27: sealing cap |
| 29: electrolyte injection opening | 36, 37: gasket |
| 60, 511, 521: insulating member | 61, 62: first/second insulator |
| 71, 72: long/short sides | 81, 82: long/short sides |
| 611: first hook | 621: second hook |
| 623: third hook | 624: insertion plate |
| 625: protrusion rim | H1, H2: terminal opening |
| H5: opening | W, W1: width |

What is claimed is:
1. A rechargeable battery comprising:
  a case accommodating an electrode assembly;
  a cap plate closing and sealing an opening of the case;
  an electrode terminal comprising a rivet terminal and a plate terminal, the rivet terminal being coupled to the electrode assembly and extending through a terminal opening in the cap plate, and the plate terminal being at an upper surface of the cap plate and coupled to the rivet terminal, the upper surface of the cap plate facing away from the case; and a first insulator and a second insulator electrically insulating the electrode terminal from the cap plate, the first insulator and the second insulator being separate from and interlocked with each other, the first insulator being between the cap plate and the plate terminal at an outer periphery of the rivet terminal, and the second insulator being coupled to the first insulator at an outer periphery thereof and being between the cap plate and the plate terminal.

2. The rechargeable battery of claim 1, wherein the first insulator accommodates the rivet terminal via an opening corresponding to the terminal opening and comprises a first hook at one side thereof, and wherein the second insulator comprises a second hook, and the second hook is coupled to the first hook.

3. The rechargeable battery of claim 2, wherein the second insulator surrounds the outer periphery of the first insulator, and wherein the second insulator comprises a third hook combined to a side of the first insulator opposite to a side thereof at which the first hook is arranged.

4. The rechargeable battery of claim 3, wherein the second insulator comprises:

an insertion plate having the same thickness as the first insulator and arranged between the cap plate and the plate terminal; and a protrusion rim protruding along an outer edge of the insertion plate to surround a periphery of the plate terminal.

5. The rechargeable battery of claim 4, wherein the protrusion rim extends along each side of second insulator except the side thereof at which the third hook is arranged to surround the periphery of the plate terminal.

6. The rechargeable battery of claim 1, wherein the first insulator comprises a first hook and is coupled to the electrode terminal in a stacking direction of the cap plate, and wherein the second insulator is inserted to be between the cap plate and the plate terminal in a lateral direction perpendicular to the stacking direction and is coupled to the first insulator by the first hook.

7. The rechargeable battery of claim 6, wherein the second insulator comprises a second hook and a third hook, the second hook being at an inner side of the second insulator, wherein the first hook of the first insulator is coupled to the second hook, and wherein the third hook is coupled to the first insulator at an opposite side of the first insulator with respect to the first hook.

8. The rechargeable battery of claim 1, wherein the first insulator has long sides corresponding to a length direction of the cap plate and short sides corresponding to a width direction of the cap plate, and wherein the first insulator comprises a first hook at one of the short sides thereof.

9. The rechargeable battery of claim 8, wherein the second insulator has long and short sides respectively corresponding to the long and short sides of the first insulator, and wherein the second insulator comprises a second hook at one of the short sides thereof, and the second hook is coupled to the first hook.

10. The rechargeable battery of claim 9, wherein the second insulator further comprises:

an insertion plate having the same thickness as the first insulator and arranged between the cap plate and the plate terminal; and a protrusion rim protruding along an outer edge of the insertion plate to surround a periphery of the plate terminal, wherein the protrusion rim is at the long sides of the second insulator and one of the short sides nearest to the second hook.

11. The rechargeable battery of claim 1, wherein the first insulator has a width that is less than a width of the cap plate, and wherein the second insulator has a width substantially the same as the width of the cap plate.

* * * * *